(12) United States Patent
Liu et al.

(10) Patent No.: US 10,740,420 B2
(45) Date of Patent: Aug. 11, 2020

(54) COMPUTER-IMPLEMENTED PLATFORM FOR GENERATING QUERY-ANSWER PAIRS

(71) Applicant: Microsoft Technology Licensing, LLC, Redmond, WA (US)

(72) Inventors: Jun Liu, Kenmore, WA (US); Mridu Baldevraj Narang, Redmond, WA (US); Guihong Cao, Sammamish, WA (US); Jinxi Xu, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 360 days.

(21) Appl. No.: 15/812,161

(22) Filed: Nov. 14, 2017

(65) Prior Publication Data
US 2019/0147108 A1 May 16, 2019

(51) Int. Cl.
| | | |
|---|---|---|
| G06F 16/9535 | (2019.01) | |
| G06N 20/00 | (2019.01) | |
| G06F 16/28 | (2019.01) | |
| G06F 16/2457 | (2019.01) | |
| G06F 16/33 | (2019.01) | |

(52) U.S. Cl.
CPC .... *G06F 16/9535* (2019.01); *G06F 16/24578* (2019.01); *G06F 16/285* (2019.01); *G06F 16/3344* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 6,675,159 B1* | 1/2004 | Lin | G06F 17/2705 |
| 7,974,976 B2 | 7/2011 | Yahia et al. | |
| 8,868,548 B2 | 10/2014 | Kurzion | |
| 2012/0102018 A1* | 4/2012 | Yang | G06F 16/3347 |
| | | | 707/709 |
| 2012/0329032 A1 | 12/2012 | Fan et al. | |
| 2014/0258286 A1 | 9/2014 | Brown et al. | |
| 2016/0098164 A1 | 4/2016 | Fey et al. | |

(Continued)

OTHER PUBLICATIONS

Schwartz, Barry, "Bing Now with Long Form Answers at the Top of the Search Results", Retrieved From <<https://www.seroundtable.com/bing-detailed-answers-20209.html>>, Apr. 27, 2015, 3 Pages.

(Continued)

*Primary Examiner* — Wilson Lee
(74) *Attorney, Agent, or Firm* — Medley, Behrens & Lewis, LLC

(57) ABSTRACT

A platform for generating query-answer pairs is described herein, wherein the platform is well-suited for generating query-answer pairs for a variety of topics. The platform comprises a topic-specific classifier that is configured to identify queries from a query log that are fact-seeking queries that belong to a topic. The platform further comprises a domain identifier component that identifies domains that are relevant to the topic, wherein the domains comprise pages. The platform further includes a passage extraction system that comprises a hierarchy of rankers, wherein the passage extraction system is configured to identify passages in the pages that belong to the domain that comprise answers to the fact-seeking queries that belong to the topic.

20 Claims, 9 Drawing Sheets

(56) References Cited

U.S. PATENT DOCUMENTS

2017/0011116 A1 1/2017 Liu et al.
2017/0161363 A1* 6/2017 Cortis .................. G06F 16/334

OTHER PUBLICATIONS

Smarty, Ann, "How to Research and Optimize for Question-Type Queries to Boost Your Brand Search Visibility", Retrieved From <<https://inbound.org/blog/how-to-research-and-optimize-for-question-type-queries-to-boost-your-brand-search-visibility>>, Retrieved on: Sep. 13, 2017, 16 Pages.

* cited by examiner

COMPUTER-IMPLEMENTED PLATFORM FOR GENERATING QUERY-ANSWER PAIRS

BACKGROUND

Computer-implemented search engines have been developed to return at least one search result to a client computing device in response to receipt of a query from the client computing device, wherein the at least one search result is identified by a computer-implemented search engine as being relevant to the query. Conventionally, search results returned by search engines are in the form of a ranked list of hyperlinks, wherein the hyperlinks point to web pages that comprise information that is found by the search engine to be relevant to the query. More recently, search engines have been developed to provide "instant answers" to a relatively small subset of fact-seeking queries, wherein an instant answer answers the fact-seeking query and is displayed, together with search results, on a search engine results page (SERP). Accordingly, the user need not navigate away from the SERP to receive an answer to the fact-seeking query issued by the user.

The conventional approach for identifying instant answers to fact-seeking queries has been labor-intensive and limited to a relatively small number of queries. For instance, with respect to fact-seeking queries related to weather (e.g., "what is the weather going to be like tomorrow"), the search engine is directed to a previously identified website or service to allow for the query to be answered. As noted above, however, this is a very limited approach, as this previously identified website or service fails to include information that answers fact-seeking queries that are not related to weather. Another exemplary approach for identifying instant answers to fact-seeking queries involves manual review of some threshold number of most popular queries, identifying fact-seeking queries amongst these popular queries, learning answers to these fact-seeking queries, and placing the answers in a table. Hence, when the search engine receives a query, the search engine searches the table to ascertain if the query is included therein, and then (when the query is included in the table) returns the answer from the table that corresponds to the query as an instant answer for the query. This approach, however, is both limited and labor-intensive, as the search engine only is able to provide instant answers to popular fact-seeking queries, and further as the answers to these popular queries are identified manually.

SUMMARY

The following is a brief summary of subject matter that is described in greater detail herein. This summary is not intended to be limiting as to the scope of the claims.

Described herein is a platform that is well-suited to generate query-answer pairs for topics defined by developers, where the platform is broadly applicable across topics, and further wherein each query-answer pair includes a fact-seeking query that belongs to a topic and an answer to the fact-seeking query. With more specificity, the platform includes a topic-specific query classifier that is configured to receive queries, and for each received query, output a label that is indicative of whether the query is a fact-seeking query that belongs to a topic for which the topic-specific classifier has been trained. The topic-specific classifier can be trained based upon: 1) words and phrases (referred to as a bag of words) set forth by a developer (or team of developers) as being germane to the topic; 2) a plurality of queries labeled by the developer(s) as to whether or not the queries are fact-seeking queries that belong to the topic; and 3) feedback from a plurality of users with respect to output of the topic-specific classifier.

With respect to 3), during a training phase for the topic-specific classifier, queries can be provided to the classifier, and for each query, the classifier can assign a label to the query that indicates whether the query is a fact-seeking query that belongs to the topic. Thus, the topic-specific query classifier outputs labels for queries, wherein the labels indicate whether the respective queries are fact-seeking queries that belong to the topic. The queries and labels output by the topic-specific classifier can be transmitted to client computing devices operated by numerous users, wherein the users are tasked with providing input as to whether the classifier correctly labeled the queries. This user input is fed back and employed to update the topic-specific classifier. After the training phase has been completed, the topic-specific classifier can be validated through utilization of a validation set of labeled queries (i.e., queries labeled by the developer(s) as being fact-seeking queries that belong to the topic or queries that are not fact-specific and/or do not belong to the topic). Performance of the topic-specific classifier is monitored with respect to the queries in the validation set, and when performance of the topic-specific classifier meets a performance metric set forth by the developer(s), the topic-specific classifier can be validated.

After the topic-specific classifier has been trained and validated, numerous queries from a search log of a search engine are provided to the topic-specific classifier, and the topic-specific classifier can, for each query, assign a label that indicates whether the query a fact-seeking query that belongs to the topic for which the classifier has been trained. Thus, the topic-specific classifier identifies a plurality of fact-seeking queries that belong to the topic.

The platform additionally includes a domain identifier component that is configured to identify domains that are relevant to the topic. The domains are web domains (e.g., web sites, such as domain.com), wherein each domain includes one or more pages. The domain identifier component, in an example, can identify domains that are relevant to the topic based upon content of the search log of the search engine. For instance, the search log includes search sessions, wherein a search session includes one or more queries issued to the search engine by a user within a window of time, identities of search results returned by the search engine based upon the one or more queries, and identities of the search results that were selected by the user during the search session. Each search result points to a page, and each page belongs to a domain. Therefore, for example, the domain identifier component can infer that a domain is relevant to the topic based upon one or more pages belonging to the domain being selected by users responsive to the users issuing fact-seeking queries to the search engine, wherein the fact-seeking queries belong to the topic.

Further, the domain identifier component can identify domains that are relevant to the topic based upon content of a web browser log. For instance, a search session in the search log can include a fact-seeking query identified as belonging to the topic, and the user may have selected a search result returned by the search engine based upon the fact-seeking query. The user may have selected the search result, thereby causing a web browser to load the web page that is pointed to by the search result. The web browser log can include data that represents navigation history of users, including pages loaded, hyperlinks selected, sequence of page views, etc. Thus, the web browser log can indicate that the user, after the web browser has loaded the page (which belongs to a first domain), selected a hyperlink in the page that causes a second page to be loaded by the web browser, where the second page belongs to a second domain. The domain identifier component can identify the second domain as being relevant to the topic based upon this user action, as it can be inferred that the second page includes information that is relevant to the fact-seeking query, and is therefore relevant to the topic. Additionally, a developer may have knowledge as to a domain being relevant to the topic, and can set forth this information to the domain identifier component. Still further, the domain identifier component can be configured to rank domains with respect to the topic, wherein the domain identifier component can assign scores to domains that are used to rank such domains based upon: 1) a number of times that search results pointing to pages belonging to the domain were selected when the search results were returned responsive to the search engine receiving a fact-seeking query identified as belonging to the topic; 2) a number of times that search results pointing to pages belonging to the domain were included in a first page of search results returned responsive to the search engine receiving a fact-seeking query identified as belonging to the topic; 3) textual similarity between a fact-seeking query and pages belonging to the domain, etc. Based upon the ranking, the topic identifier component can output a threshold number of domains as being relevant to the topic.

The platform also comprises a passage extraction system that is configured to receive the identified fact-seeking queries that belong to the topic and identify passages from pages that belong to the identified domains that comprise answers to the fact-seeking queries. The passage extraction system includes a hierarchical arrangement of rankers. Several of these rankers, for example, can be general purpose rankers that are configured to rank passages without considering features that are specific to the topic. In contrast, at least a last of the rankers in the hierarchy of rankers can be a topic-specific ranker that considers features that are specific to the topic. For example, for the topic "elections," the topic-specific ranker can assign a weight to a passage as a function of whether or not the passage includes the term "Senate." This is a feature that is specific to the topic and would not be employed in a general-purpose ranker. The last of the rankers in the hierarchy can be trained in a manner similar to the training of the topic-specific classifier, wherein output of the last of the rankers is transmitted to computing devices operated by workers, who provide feedback as to performance of the ranker. The last of the rankers can then be updated based upon such feedback.

In operation, the passage extraction system receives a query labeled as being a fact-seeking query that belongs to the topic, and searches through pages that belong to the domains identified as being relevant to the topic for passages that are relevant to the fact-seeking query. A first ranker can identify a first plurality of passages from these pages that are relevant to the fact-seeking query, and can rank such passages to generate a first ranked list of passages. The passage extraction system can then select a first threshold number of the most highly ranked passages from the first ranked list of passages, and the fact-seeking query can be provided to a second ranker. The second ranker re-ranks the first threshold number of passages to form a second ranked list of passages, and the passage extraction system selects a second threshold number of the most highly ranked passages in the second ranked list of passages (where the second threshold number is lower than the first threshold number). The passage extraction system, then, filters passages at each ranker in the hierarchy of rankers. The last ranker in the hierarchy generates an Nth ranked list of passages, and the most highly-ranked passage is selected as being an answer to the fact-seeking query if the score assigned to the most highly-ranked ranked passage is above a threshold.

If the score assigned to the most highly-ranked passage by the Nth ranker is below the threshold, the passage extraction system can fail to generate a query-answer pair that includes the fact-seeking query. When the Nth ranker assigns a score to the most highly-ranked passage, the passage extraction system can generate a query-answer pair, wherein the query-answer pair includes the fact-seeking query and the passage. Again, the passage extraction system can perform this process for each fact-seeking query identified as belonging to the topic by the topic-specific classifier. Accordingly, a plurality of query-answer pairs are output by the passage extraction system, such that when the search engine receives a query belonging to a query-answer pair, the search engine can output the corresponding passage from the query-answer pair to the user. The platform described above is advantageous over conventional approaches for generating query-answer pairs, in that the platform is sufficiently general to be usable with nearly any topic.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
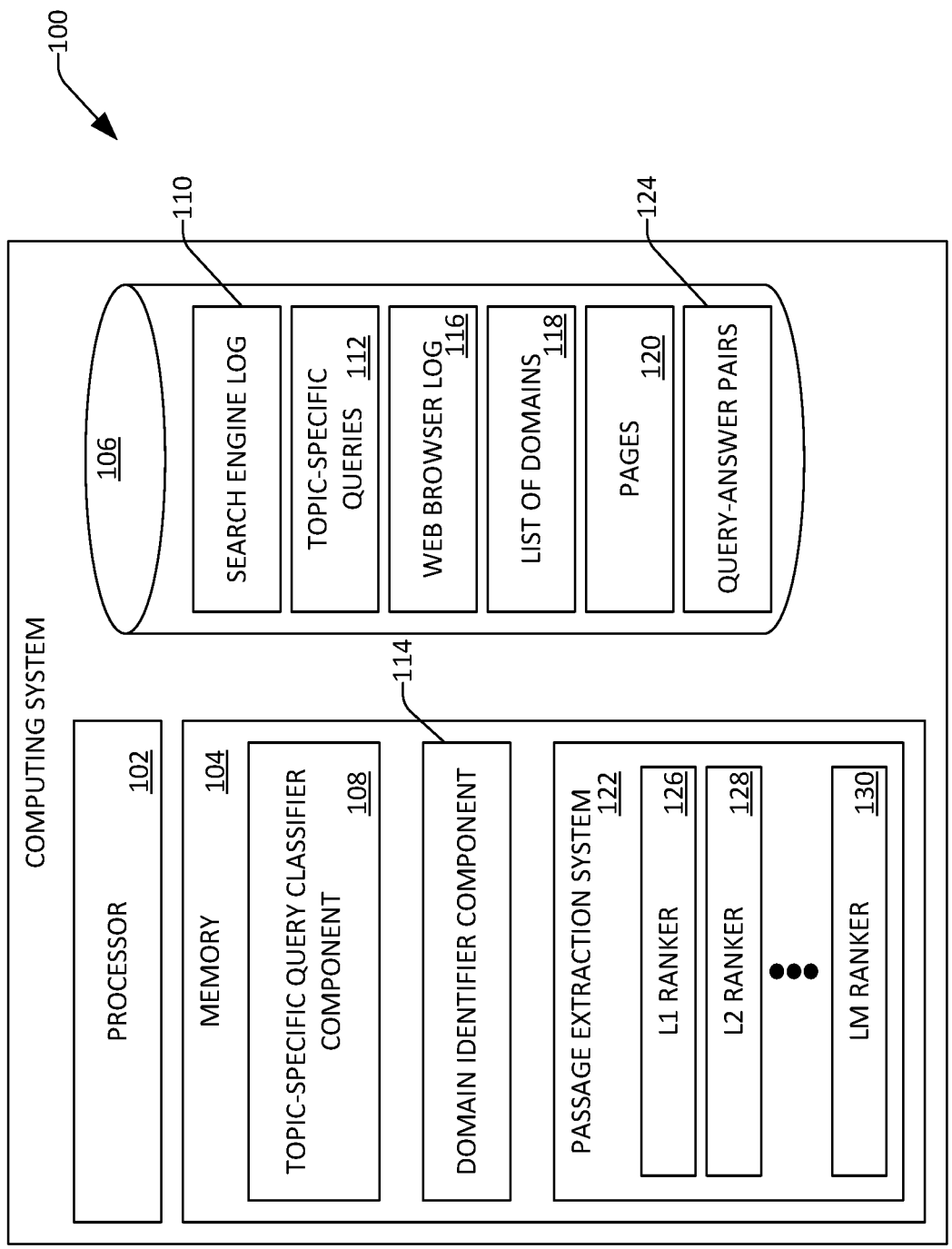
FIG. 1 is a functional block diagram of an exemplary computing system that is configured to generate query-answer pairs.

Various technologies pertaining to a platform that is well-suited to generate query-answer pairs for fact-seeking queries that belong to a topic, while being general as to the topic, are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Various technologies pertaining to generating query-answer pairs are described herein, wherein a query-answer pair comprises a fact-seeking query and a passage that comprises an answer (a fact) to the fact-seeking query. With more specificity, a platform is described herein that is well-suited to generate query-answer pairs for a variety of topics. The platform is general, in that the platform is readily usable by a developer or development team to select a topic for which query-answer pairs are to be generated.

With reference now to FIG. 1, an exemplary computing system 100 is illustrated. The computing system 100 includes at least one processor 102, memory 104 that is operably coupled to the processor 102, and a data store 106 that is operably coupled to the processor 102. The memory 104 includes a plurality of components and systems that are executed by the processor 102. The memory 104 includes a topic-specific query classifier component 108 that is configured to receive queries and, for each received query, assign a label that is indicative of whether the query is a fact-seeking query that belongs to a topic for which the topic-specific query classifier component 108 has been trained. The topic-specific query classifier component 108 can be trained to label queries with respect to any suitable topic, such as "elections," "Olympics," "sports," "finance," and so forth, wherein a developer or development team defines the boundaries of the topic. For instance, the developer or development team can set forth words and phrases as boundaries for the topic, wherein the words and phrases are used in connection with training the topic-specific query classifier component 108.

In more detail relating to operation of the topic-specific query classifier component 108, the data store includes a search engine log 110, wherein the search engine log 110 includes data for user search sessions, where each user search session includes one or more queries submitted to the search engine by a user, identities of search results returned by the search engine based upon the one or more queries, and identities of search results selected by the user. The topic-specific query classifier component 108 can receive queries in the search engine log 110 and, for each of the received queries, is configured to assign a label that indicates whether the received query is a fact-seeking query that belongs to the topic. A fact-seeking query is a query set forth by a user who is attempting to obtain a fact. Exemplary terms often found in fact-seeking queries include "who", "what", "where", "when", "how", etc. Oftentimes, users will issue a fact-seeking query without these words, however, and the topic-specific query classifier component 108 can recognize such queries as fact-seeking queries. For instance, rather than issuing the query "how many pounds are in a ton?", a user may issue the query "pounds in a ton." The information retrieval intent of both queries is the same; the issuers of the queries desire to receive an answer as to how many pounds are in a metric ton. The topic-specific query classifier component 108 can utilize query clustering techniques, natural language processing (NLP) technologies, and the like in connection with identifying fact-seeking queries that belong to the topic. In summary, the topic-specific query classifier component 108 identifies, from the search engine log 110, a plurality of fact-seeking queries that belong to the topic for which the topic-specific query classifier component 108 has been trained, and causes these topic-specific queries 112 to be stored in the data store 106 (e.g., in a table).

The memory 104 also includes a domain identifier component 114 that is configured to identify domains that are relevant to the topic, wherein a domain is a web site (e.g., domain.com), and further wherein each domain includes a page. As will be described in greater detail herein, the domain identifier component 114 can identify domains that are relevant to the topic based upon content of the search engine log 110 and content of a web browser log 116 that is retained in the data store 106. The web browser log 116 can include information as to activities performed by users who employ a web browser. These activities can comprise, for example, pages viewed by users of the web browser, links clicked on pages by users of the web browser, and so forth. Further, the domain identifier component 114 can receive input from a developer or development team as to domains that are known by the developer or development team to be relevant to the topic.

Briefly, the domain identifier component 114 can search the search engine log 110 using the queries 112 to identify pages included in search results presented to users who issued the queries 112, pages selected by the users who issued the queries 112, other queries issued by users that selected the pages, other pages selected by users who issued the other queries, etc. Domains having pages that are often shown to the users who issued the queries 112 and/or selected by the users who issued the queries 112 can be inferred to be relevant to the topic. The domain identifier component 114 can also take into consideration navigation of users who set forth the queries as set forth in the web browser log 116. For example, when a user issues a query in the queries, selects a search result resulting in provision of a page to the user, and then selects a link from that page that directs the user to a different page belonging to a different domain, it can be inferred that the different domain may be relevant to the topic.

In yet another example, the search engine log 110 can comprise data that indicates that a user issued a query from the queries 112 and selected a page from search results provided by the search engine based upon the query. The search engine log 110 can further comprise data that indicates that a second user issued a second query (which is not included in the queries 112) and selected the page from search results provided by the search engine based upon the second query. Hence, the query and the second query can be inferred to be related. The domain identifier component 114 can identify a second page that was selected by some user in response to such user being provided with search results from the search engine based upon the second query, and can infer that a second domain (to which the second page belongs) is relevant to the topic. The domain identifier component 114 can search for domains using this approach at a breadth defined by the developer or development team (i.e., the domain identifier component can walk a query-search result directed graph to identify domains that are relevant to the topic).

The domain identifier component 114 can assign scores to domains to rank domains with respect to relevance of the domains to the topic, where the domain identifier component can assign a score to a domain as a function of, for example: 1) a number of pages belong to the domain that are included in search engine results pages presented to users responsive to the search engine receiving the queries 112; 2) a number of pages that belong to the domain that are selected by the users in response to the pages being presented in search results based upon the queries 112; 3) a number of times users navigated to pages belonging to the domain after issuing the queries 112, etc. The domain identifier component 114 ranks the domains and then outputs a list of domains 118 for the topic, wherein the list of domains 118 comprises a threshold number of domains. The list of domains 118 may additionally or alternatively comprise a domain that is manually identified by the developer or development team as being relevant to the topic.

As indicated previously, the domains in the list of domains 118 each include at least one page. These pages 120 can be identified in the data store 106. For instance, the pages 120 can be cached in the data store 106 or, alternatively, the data store 106 can include pointers to such pages. The computing system 100 also includes a passage extraction system 122 that receives the queries 112 and, for a subset of the queries, identifies passages in the pages 120 that comprise answers to the subset of queries. Thus, the passage extraction system 122 generates query-answer pairs 124, where each query-answer pair includes a fact-seeking query from the queries 112 and a passage that comprises an answer to the fact-seeking query.

In operation, the passage extraction system 122, for a received query from the queries 112, identifies an answer for the query through utilization of a hierarchy of rankers. For example, the passage extraction system 122 includes a plurality of rankers 126-130, where rankers in upper levels of the hierarchy (e.g., the first level ranker 126 and the second level ranker 128) may be general-purpose rankers, while rankers in the lower levels of the hierarchy (e.g., the Mth-level ranker 130) is a topic-specific ranker. In other words, the Mth level ranker 130 is configured to consider features that are specific to the topic when ranking passages.

With more detail regarding the passage extraction system 122, the passage extraction system 122 receives a query from the queries 112 and the first level ranker 126 extracts passages from the pages 120 that are relevant to the query and ranks such passages, thereby creating a first ranked list of passages. It is to be understood that the first level ranker 126 limits its analysis to the pages 120 (rather than searching over all pages on the World Wide Web). The passage extraction system 122 then selects a first threshold number (e.g. 100) of the most highly ranked passages in the first ranked list of passages, and provides the first threshold number of passages to the level two ranker 128. The level two ranker 128 receives the query and re-ranks the first threshold number of passages to generate a second ranked list of passages. The passage extraction system 122 selects a second threshold number (e.g., 50) of the most highly ranked passages, and provides the second threshold number of passages to the next ranker in the hierarchy of rankers. Therefore, the rankers 126-130 are employed to sequentially filter passages until the Mth-level ranker 130 receives some relatively small number of passages (e.g., 20) for consideration. The Mth-level ranker 130 receives the query and outputs an Mth ranked list of passages with respect to the query, wherein a most highly ranked passage in the Mth ranked list of passages has a score assigned thereto by the Mth-level ranker. When the score is above a predefined threshold, the passage extraction system 122 selects the most highly ranked passage as comprising an answer to the query. Contrarily, when the score is at or below the predefined threshold, the passage extraction system 122 outputs an indication that there is a lack of a sufficient answer to the fact-seeking query. The passage extraction system 122 repeats this process for each query in the queries 112, thereby generating the query-answer pairs 124. Subsequently, when a user sets forth a query that is included in the query-answer pairs 124, a passage corresponding to the received query in the query-answer pairs is returned to a client computing device employed by the user to issue the query.

As indicated previously, the computing system 100 has several advantages over conventional approaches for generating query-answer pairs. The computing system 100 represents a general platform that is well-suited to generate query-answer pairs for any topic set forth by a developer or development team. This is in contrast to conventional approaches, which have been limited to providing answers to only the most popular queries. Further, the passage extraction system 122, through utilization of the hierarchical rankers, can identify answers to fact-seeking queries belonging to the topic both accurately and efficiently.

Figure 2:
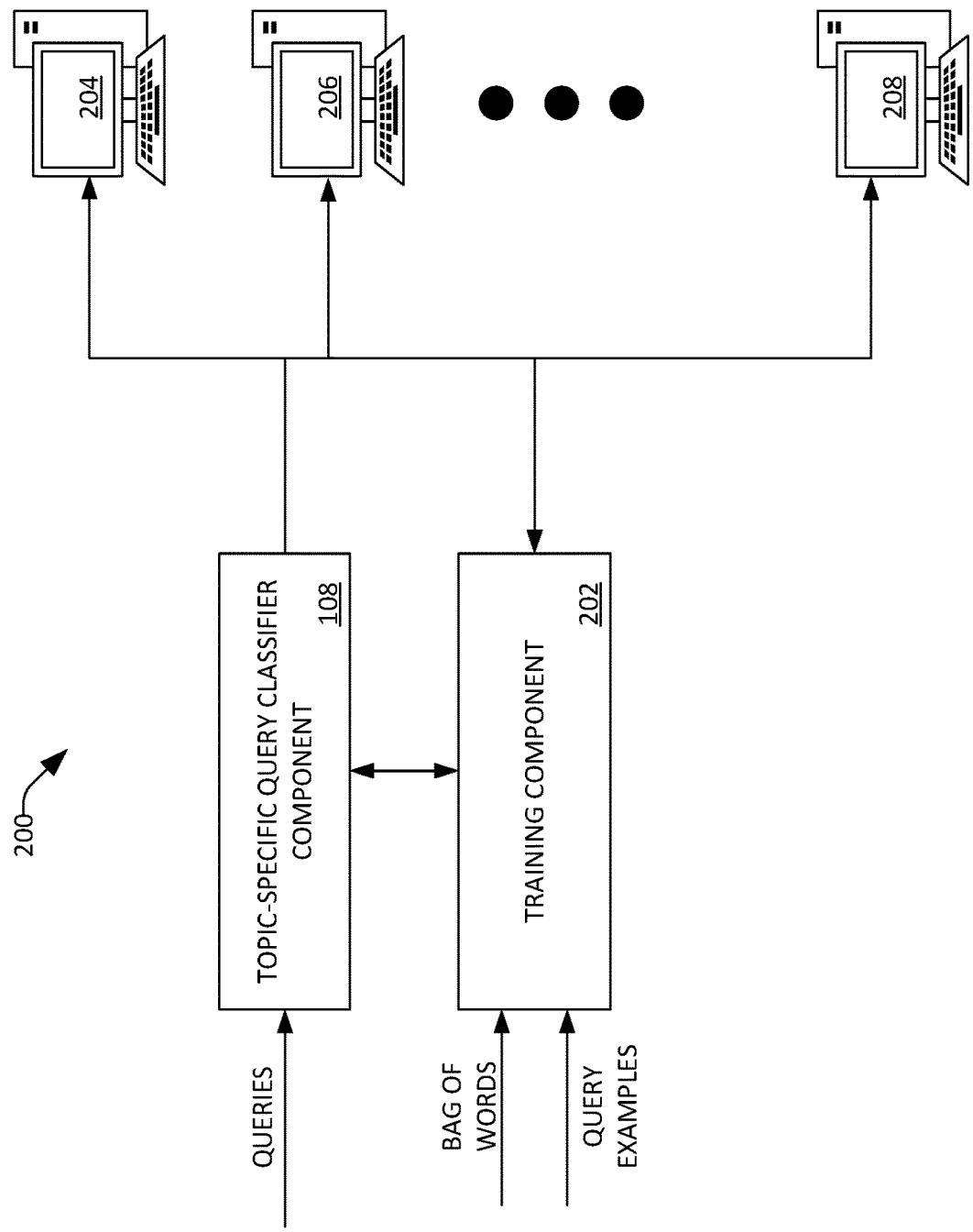
FIG. 2 is a functional block diagram of an exemplary system that is configured to train and validate a topic-specific query classifier.

Referring now to FIG. 2, an exemplary system 200 that is configured to train and validate the topic-specific query classifier component 108 is illustrated. The system 200 includes a training component 202 that is configured to train the topic-specific query classifier component 108. The training component 202 can include any suitable machine learning (ML) algorithm that is suitable for training the topic-specific query classifier component 108. When training the topic-specific query classifier component 108, the training component 202 can receive a bag of words set forth by a developer or development team, wherein the bag of words includes words and phrases identified by the developer or development team as defining the topic. The training component 202 can also receive query examples, wherein the query examples comprise fact-seeking queries that belong to the topic, queries that belong to the topic but are not fact-seeking queries, fact-seeking queries that do not belong to the topic, and queries that are neither fact-seeking queries nor belong to the topic. These query examples can be labeled, and the training component 202 can train the topic-specific query classifier component 108 based upon the bag of words and the query examples.

The topic-specific query classifier component 108 can additionally be trained and/or validated based upon feedback received from workers. For example, the topic-specific query classifier component 108, responsive to being trained by the training component 202 based upon the bag of words and the query examples, can be provided with queries from the search engine log 110. As described previously, the topic-specific query classifier component 108 can assign a label to each received query, wherein the topic-specific query classifier component 108 can assign a value of "1" to fact-seeking queries that belong to the topic, and a value of "0" for all other queries. Some of these queries and the labels assigned thereto by the topic-specific query classifier component 108 can be transmitted to a plurality of client computing devices 204-208 operated by workers who are tasked with providing feedback as to the queries and assigned labels. These workers may be crowd-sourced workers who are paid for providing feedback or who volunteer to provide feedback. The workers review the queries and the labels assigned thereto, and provide feedback as to whether the topic-specific class query classifier component 108 has assigned the appropriate label to the queries. For example, the client computing devices 204-208 can be provided with at least some words or phrases from the bag of words, as well as a description of the topic, and can indicate whether the topic-specific query classifier component 108 has properly assigned labels to received queries.

The training component 202 receives this feedback and updates the topic-specific query classifier component 108 based upon the feedback. When there is a relatively insignificant amount of feedback that indicates that the topic-specific query classifier component 108 has assigned an incorrect label to a query, the topic-specific query classifier component 108 can be validated and all queries from be search engine log 110 can be provided to the topic-specific query classifier component 108. In another exemplary embodiment, a set of validation data (not used in training of the topic-specific query classifier component 108) can be provided to the topic-specific query classifier component 108, and the topic-specific query classifier component 108 can be validated (or not validated) based upon performance of the topic-specific query classifier component 108 with respect to the validation data.

Figure 3:
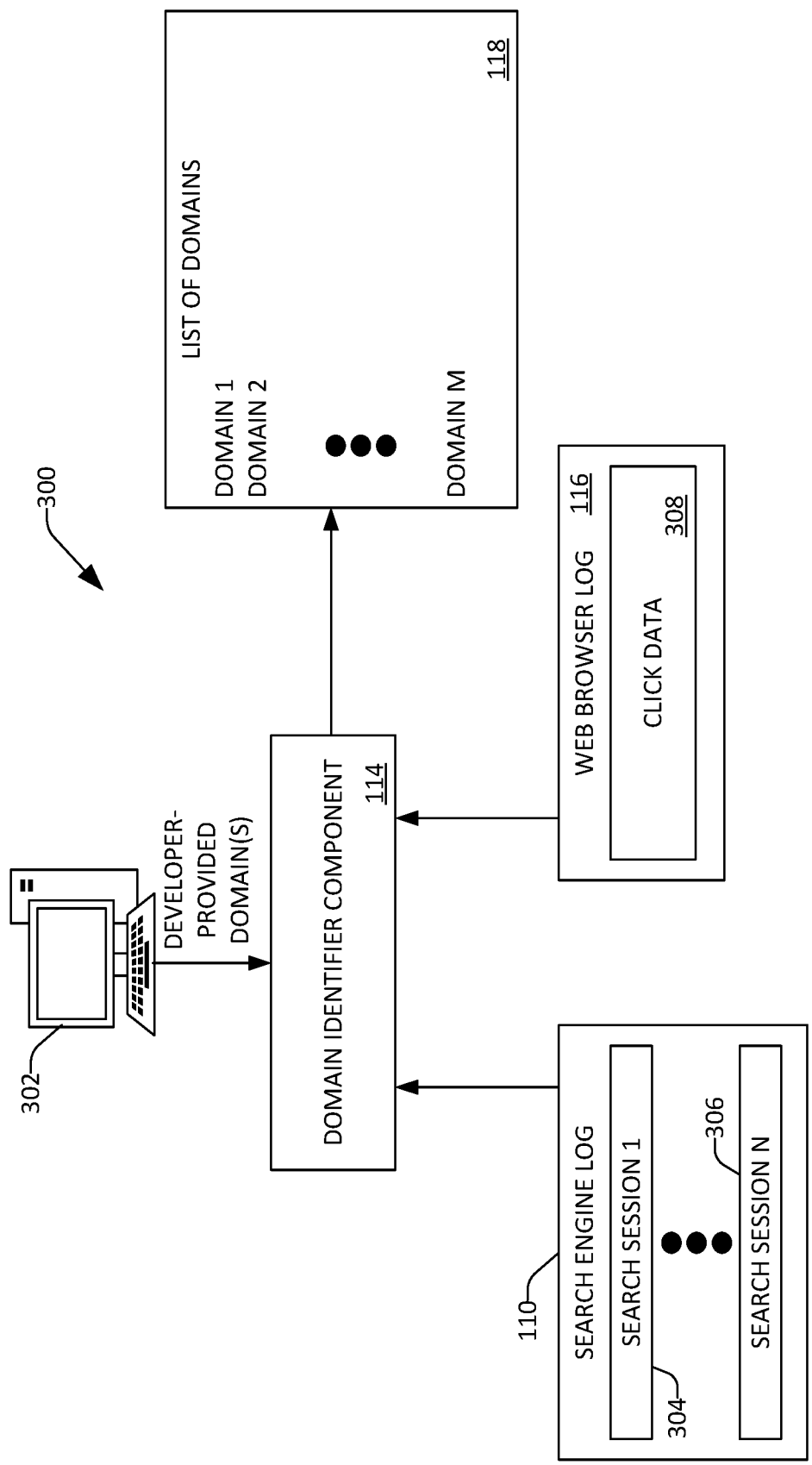
FIG. 3 is a functional block diagram of an exemplary system that is configured to identify domains that are relevant to a topic.

Now referring to FIG. 3, a functional block diagram 300 that depicts operation of the domain identifier component 114 is shown. The system 300 includes a client computing device 302 operated by a developer. The developer can identify one or more domains that are known by the developer to be relevant to the topic. Additionally, the domain identifier component 114 can automatically identify domains that are relevant to the topic based upon content of the search engine log 110 and the web browser log 116. The domain identifier component 114 outputs the list of domains 118, wherein the list of domains 118 includes a threshold number of domains identified as being relevant to the topic.

The domain identifier component 114 receives the queries 112 labeled by the topic-specific query classifier component 108 as belonging to the topic. The domain identifier component 114 then searches the search engine log 110 using these queries 112 to identify search results (pages) selected by users who issued the queries. In an example, the search engine log 110 includes a plurality of search sessions 304-306, wherein each search session includes at least one query set forth by a user, identities of pages included in search results returned to the user by the search engine based upon the at least one query, and, if applicable, identities of page(s) selected by the user. The domain identifier component 114 receives a query from the queries 112 and searches the search engine log 110 for search sessions that include the query. For an identified search session (e.g., the search session 304) that includes the query, the domain identifier component 114 identifies at least one of: 1) pages represented in search results included in a SERP based upon the query, regardless of whether the user selected any search results, or 2) page(s) represented in the search results included in the SERP that were selected by the user. The identifier component 114, based upon the Uniform Resource Locator (URL) of a page, can identify the domain to which the page belongs. Hence, for each query in the queries, the domain identifier component 114 can identify one or more domains that are relevant to the query, and therefore relevant to the topic. Further, as indicated previously, the domain identifier component 108 can expand the search for the domain by walking a click graph, starting with a page selected by a user who issued a query in the queries 112. The developer or the team of developers can define a number of steps to walk in the click graph when identifying domains that are relevant to the topic. Moreover, as noted above, the domain identifier component 114 can identify domains that are relevant to the topic based upon the web browser log 110, and specifically click data (e.g., which represents user navigation across pages) in the web browser log 110.

Further, the domain identifier component 114 can rank the domains utilizing a suitable ranking approach. For instance, for each instance in the search engine log 110 that a user is evidenced as clicking on a search result that represents a page responsive to issuing a query in the queries 112, the domain identifier component 114 can assign a first score to that domain. Likewise, each time a page belonging to a domain is included in a SERP provided by the search engine based upon a query in the queries 112, the domain identifier component 114 can assign a second score to such domain. Based upon these scores, the domain identifier component 114 can rank the domains, thereby generating a ranked list. The domain identifier component 114 can select a threshold number of most highly ranked domains to include in the list of domains 118. The domain identifier component 114 can additionally contemplate the web browser log 116 when ranking domains for the topic. In an example, the click data 308 can indicate that a user viewed a SERP, then selected a search result on that SERP, resulting in a browser loading a page represented by the search result. The click data 308 can further indicate that the user subsequently selected a link on the page, causing the browser to load a third page. As the user caused the browser to load the third page shortly after issuing a query in the queries 112, it can be inferred that a domain to which the page belongs is relevant to the topic. The domain identifier component 114 can consider this activity of users when identifying domains and when ranking the domains.

Figure 4:
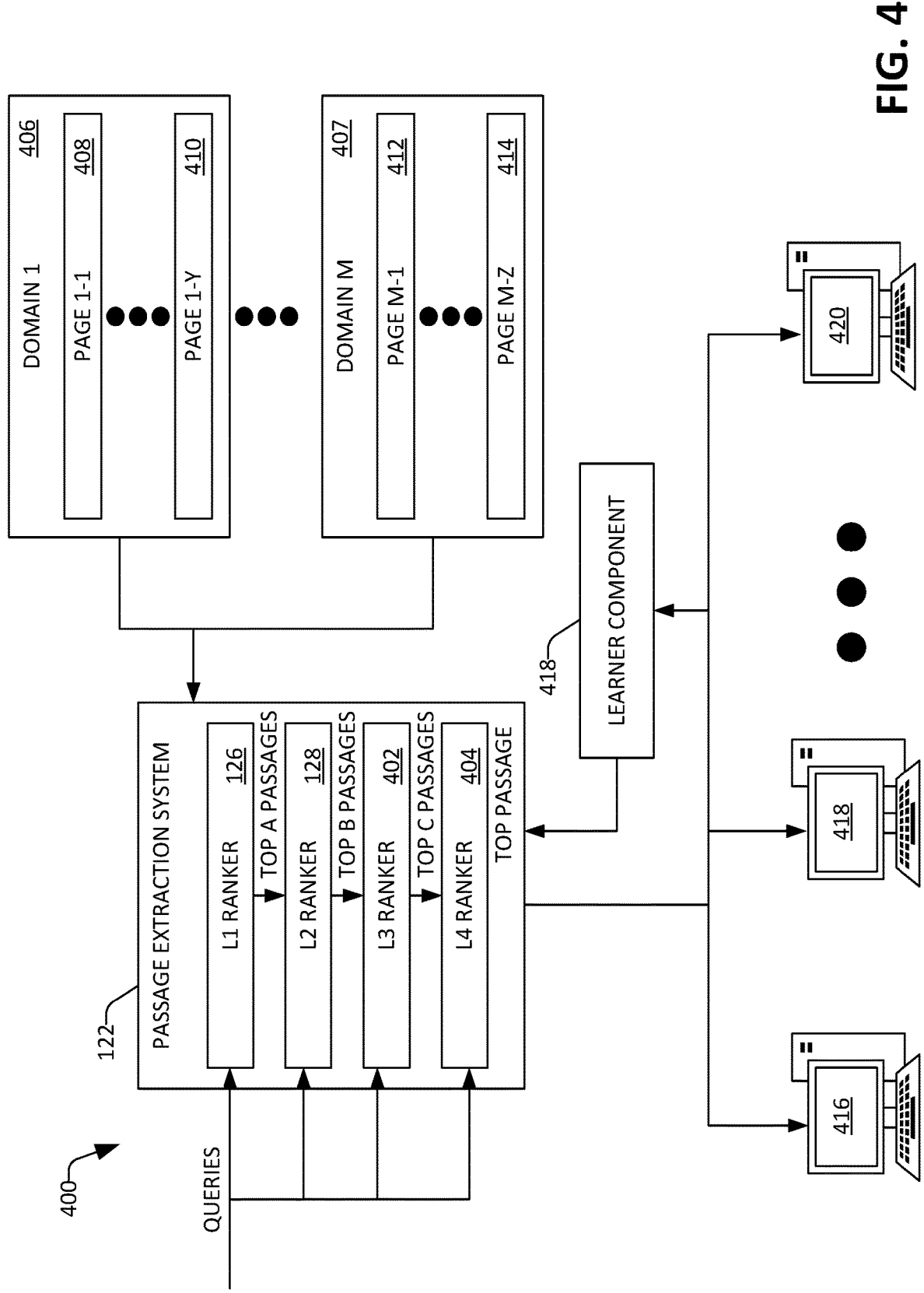
FIG. 4 is a functional block diagram of an exemplary system that is configured to train and validate a passage extraction system.

Now referring to FIG. 4, an exemplary system 400 that is configured to train and validate the passage extraction system 122 is illustrated. In this example, the passage extraction system 122 includes four rankers: the first level ranker 126, the second level ranker 128, a third level ranker 402, and a fourth level ranker 404. The passage extraction system 122 has access to pages that belong to the domains in the list of domains 118 for the topic. As shown in FIG. 4, the passage extraction system 122 has access to pages that belong to domains 406-407. The first domain 406 includes a first plurality of pages 408-410, while the Mth domain 407 includes a second plurality of pages 412-414.

The system 400 further comprises a learner component 418 that is configured to update at least the fourth level ranker 404 based upon feedback received pertaining to operation of the passage extraction system 122. During training of the passage extraction system 122, the passage extraction system 122 is provided with a plurality of queries labeled as belonging to the topic (where each query, in the queries, is a fact-seeking query). For a query received by the passage extraction system 122, the first level ranker 126 searches the pages 408-414 belonging to the domains 406-412 based upon the query, and extracts and ranks passages with respect to the query, thereby generating a first ranked list of passages. The passage extraction system 122 then selects a first threshold number of passages from the first ranked list of passages (the top A passages), and makes the first threshold number of passages available to the second level ranker 128 (such that the second level ranker 128 only considers the first threshold number of passages). The second level ranker 128 re-ranks this first threshold number of passages with respect to the query, thereby generating a second ranked list of passages. The passage extraction system 122 selects a second threshold number of passages (the top B passages) from the second ranked list of passages, and makes the second threshold number of passages available to the third level ranker 402.

The third ranker 402 re-ranks the second threshold number of passages with respect to the query, thereby generating a third ranked list of passages. The passage extraction system 122 selects a third threshold number of passages (the top C passages) from the third ranked list of passages and makes the third threshold number of passages available to the fourth level ranker 404. The fourth level ranker 404 re-ranks the third threshold number of passages with respect to the query, thereby generating a fourth ranked list of passages.

This process is repeated for each of the queries received by the passage extraction system 122. A plurality of computing devices 416-420 operated by a respective plurality of crowd-sourced workers are respectively provided with the queries, information pertaining to the topic, and the fourth ranked list of passages for the queries. The plurality of crowd-sourced workers can provide feedback as to the performance of the fourth level ranker 404, and such feedback can be provided to the learner component 418. The learner component 418 can update the fourth level ranker 404 based upon the feedback. As described previously, the upper level rankers in the hierarchy (e.g., the first level ranker 126 and the second level ranker 128) may be general purpose rankers and are, therefore, not updated by the learner component 418. A lowest level ranker in the hierarchy (e.g., the fourth level ranker 404), however, may be a ranker that is configured to be specific to the topic. Accordingly, feedback received from the client computing devices 416-420 can be employed to update features considered by the fourth level ranker 404 and to update weights assigned to features by the fourth level ranker 404 when ranking passages. Responsive to the passage extraction system 122 being trained, the passage extraction system 122 can be provided with all queries in the topic-specific queries 112 and can generate query-answer pairs as described above.

Figure 5:
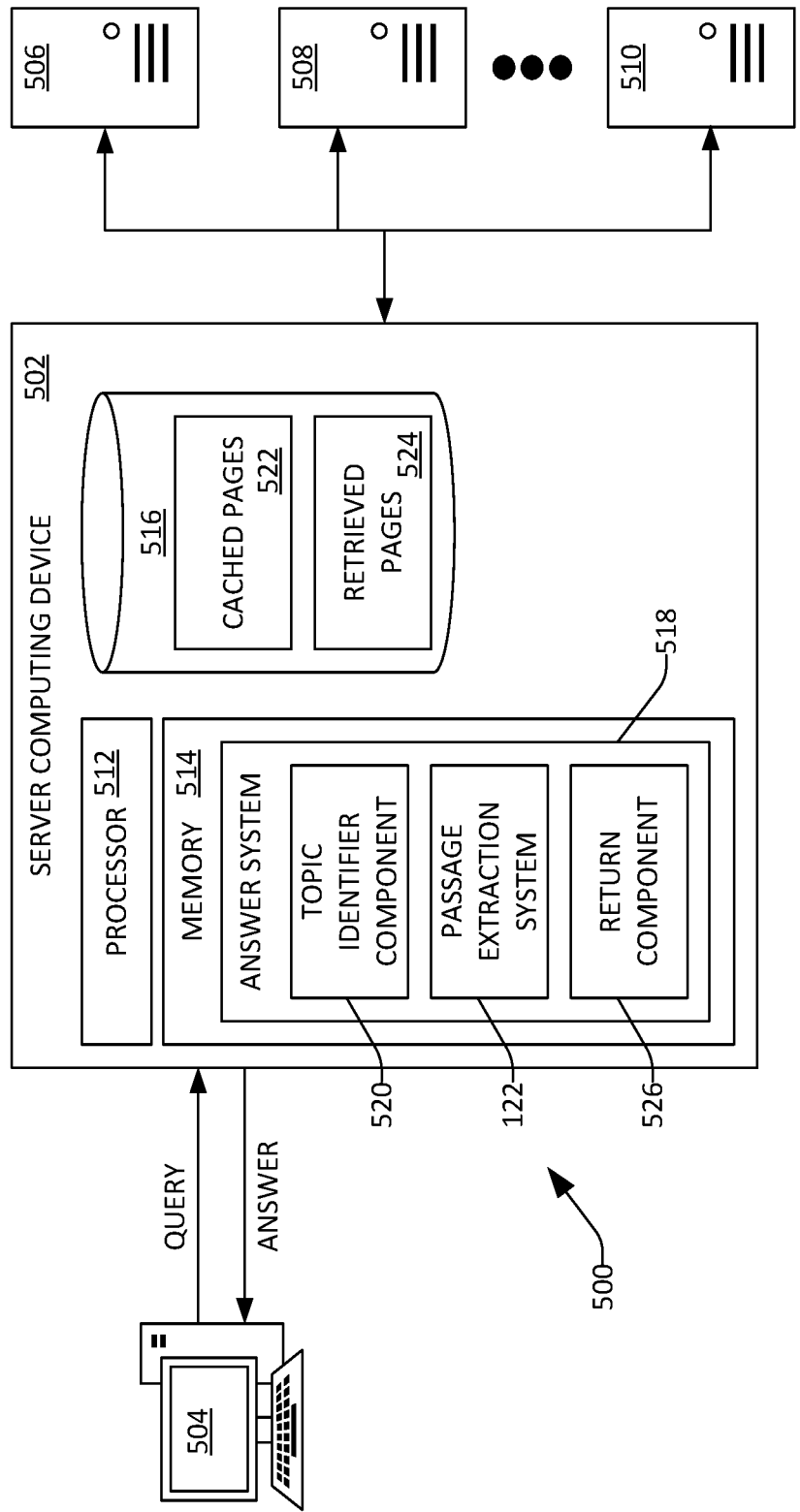
FIG. 5 is a functional block diagram of an exemplary system that is configured to return an answer to a fact-seeking query in response to receipt of the fact-seeking query.

Now referring to FIG. 5, an exemplary system 500 that is configured to return an answer responsive to receipt of a fact-seeking query is illustrated. The system 500 includes a server computing device 502, a client computing device 504 operated by an end-user, and a plurality of web servers 506-510. The client computing device 504 is in network communication with the server computing device 502, and the server computing device 502 is in network communication with the web servers 506-510. The server computing device 502 includes a processor 512 and memory 514 that is operably coupled to the processor 512. The server computing device 502 also includes a data store 516 that is operably coupled to the processor 512. The memory 514 includes an answer system 518 that is configured to return an answer to the client computing device 504 when the client computing device 504 issues a fact-seeking query that belongs to a specific topic to the server computing device 502. The answer system 518 includes a topic identifier component 520 that identifies a topic responsive to receipt of the query from the client computing device 504. For instance, the topic identifier component 520 can identify the topic based solely upon the query received from the client computing device 504. In another example, the topic identifier component 520 can identify the topic based upon user search history.

In a nonlimiting example, the topic identifier component 520 can be provided with the query, and can search a table of fact-seeking queries for the received query. When the received query is included in the table, the topic identifier component 528 can identify a topic that is assigned to the fact-seeking query in the table (which can then be mapped to a plurality of pages belonging to domains identified as being relevant to the topic). The answer system 518 also includes the passage extraction system 122 that identifies a passage that comprises an answer to the received query. For example, the data store 516 can include cached pages 522 that belong to domains identified as being relevant to the topic, and the passage extraction system 122 can search the cached pages 522 for a passage that includes an answer to the query. In another example, the cached pages 522 may not include all pages that belong to domains identified as being relevant to the query. When this occurs, the passage extraction system 122 can cause such pages to be retrieved from the web servers 506-510 and be retained in the data store 516 as retrieved pages 524. The passage extraction system 122 can operate as described above when identifying a passage from the cached pages 520 and/or retrieved pages 522 that comprises an answer to the query. The answer system 518 additionally includes a return component 526 that causes a passage, identified by the passage extraction system 122 as comprising the answer to the query, to be returned to the client computing device 504.

In an example, the client computing device 504 may be a computing device that comprises a display, and the return component 526 can cause the passage that comprises the answer to the query to be shown on the display (e.g., on a SERP together with search results). In another example, the client computing device 504 may be a mobile telephone, and the user of the client computing device 504 may set forth the query as a voice query to the mobile telephone. The return component 526 may then transmit data to the client computing device 504 that causes the client computing device 504 to audibly output the passage that comprises the answer to the query. Hence, the user may employ a digital assistant executing on the client computing device 504 to transmit the query to the server computing device 502, and the digital assistant can audibly return the answer to the query to the user. In yet another example, the client computing device 504 may be a smart speaker, wherein the user can set forth the query to the smart speaker (which includes a microphone), and the return component 526 can cause the smart speaker to audibly output the passage that comprises the answer to the query to the user. The passage can be a sentence, a phrase, a table, an image, a video clip, or the like.

Figure 6:
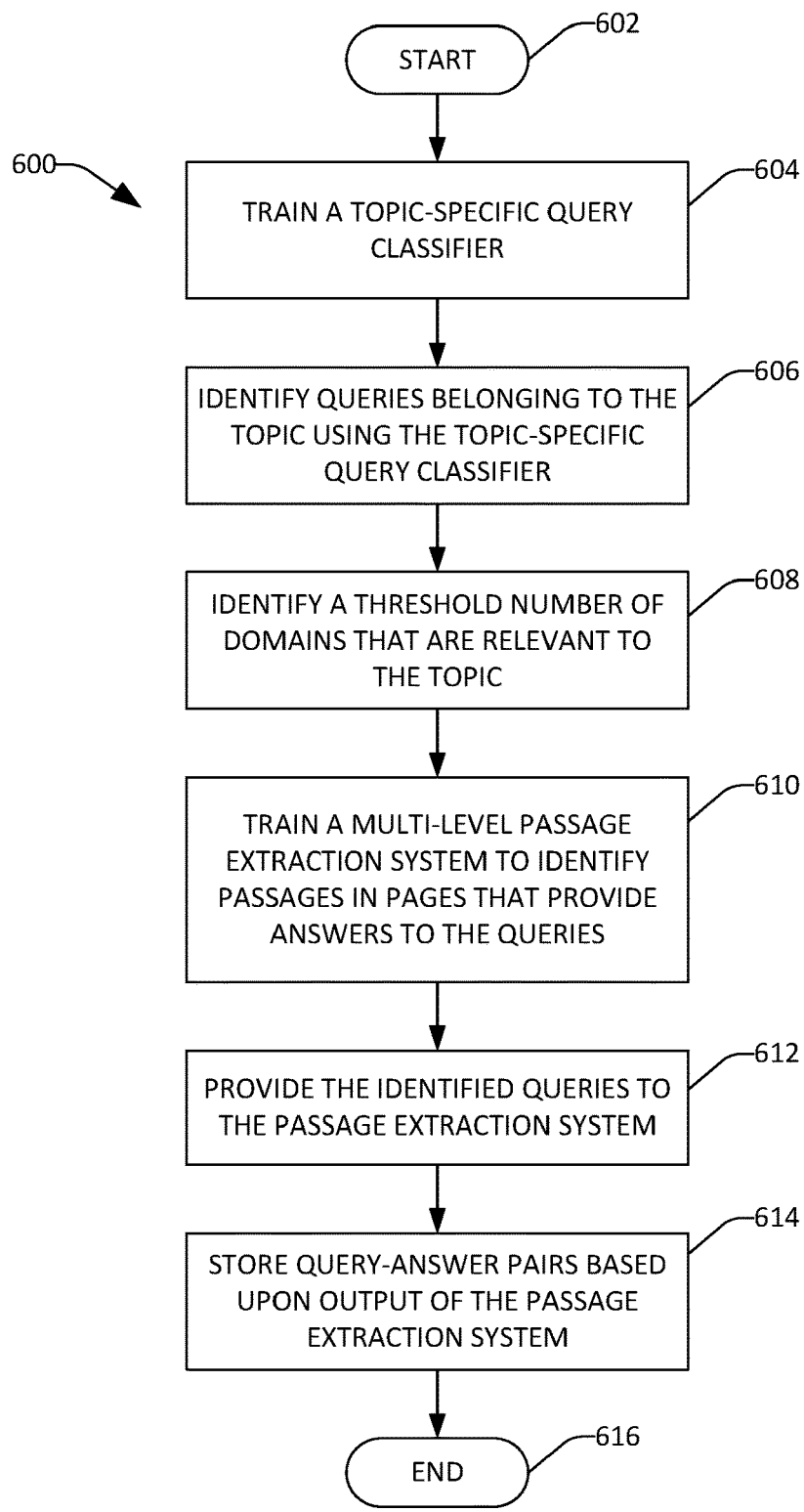
FIG. 6 is a flow diagram illustrating an exemplary methodology for generating query-answer pairs.
Figure 7:
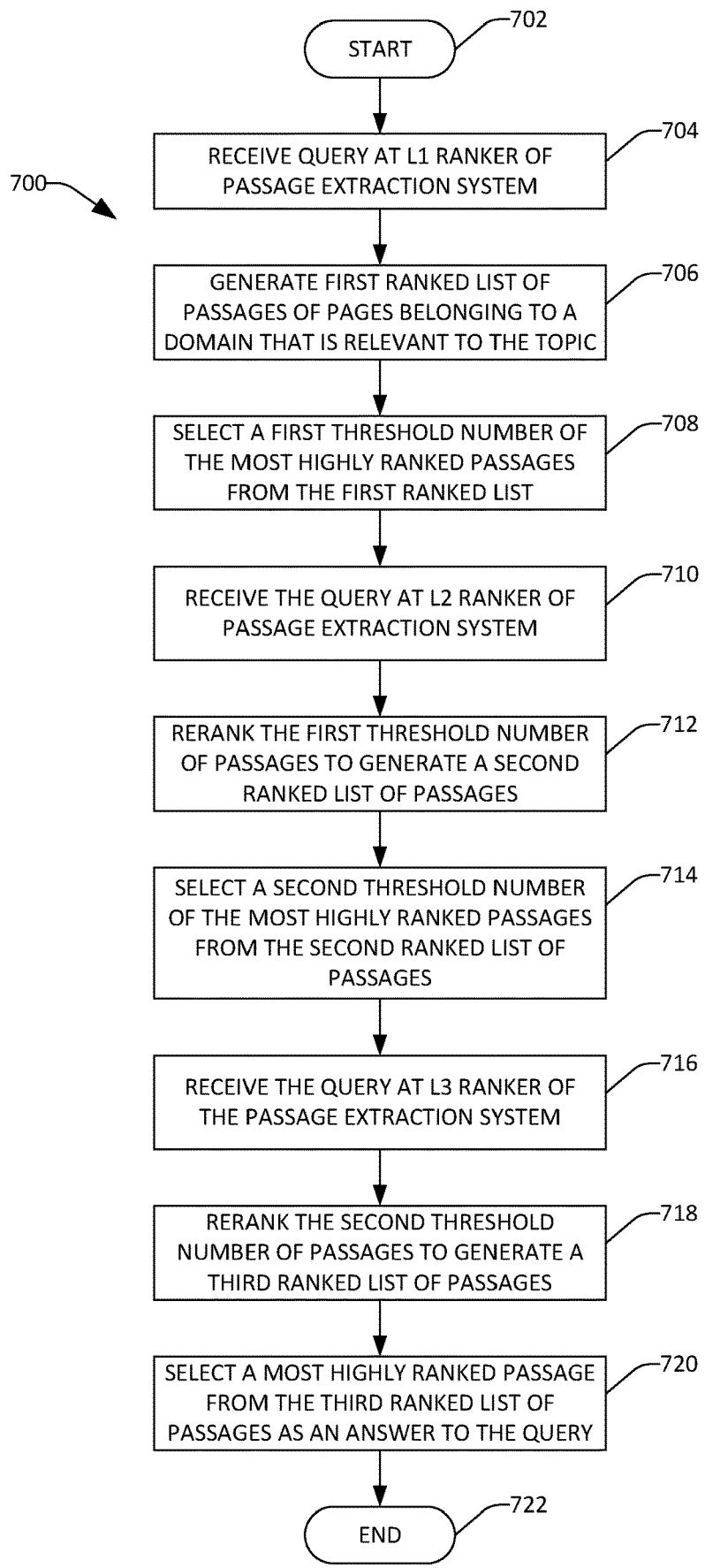
FIG. 7 is a flow diagram illustrating an exemplary methodology for identifying a passage from a page as comprising an answer to a fact-seeking query that belongs to a topic, wherein the page belongs to a domain previously identified as being relevant to the topic.
Figure 8:
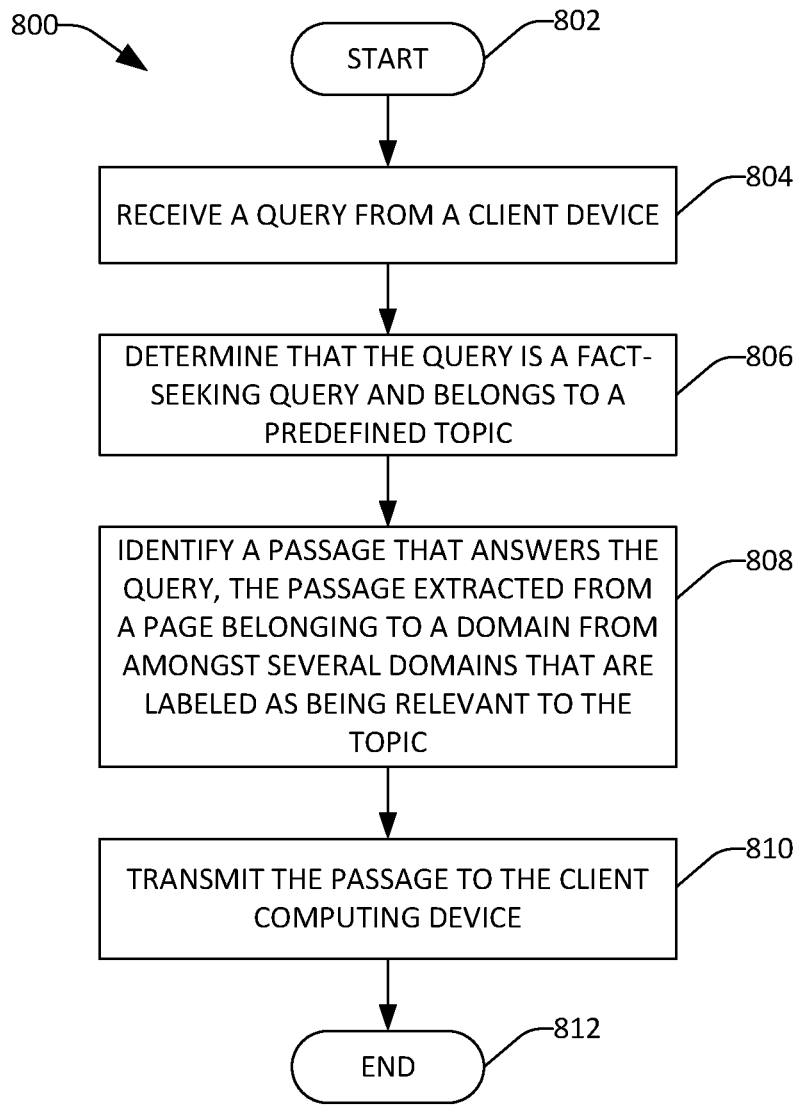
FIG. 8 is a flow diagram illustrating an exemplary methodology for transmitting an answer to a fact-seeking query to a client computing device that submitted the fact-seeking query.

FIGS. 6-8 illustrate exemplary methodologies relating to generating query-answer pairs for topics. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 6, an exemplary methodology 600 for generating query-answer pairs is illustrated. The methodology 600 starts at 602, and at 604, a topic-specific query classifier is trained to assign labels to queries as to whether the queries are fact-seeking queries that belong to a topic. As described above, training the classifier may include setting forth a bag of words identified by a developer or development team as corresponding to the topic, and training the classifier based upon the bag of words. Additionally, the classifier can be trained based upon labeled example queries. At 606, using the topic-specific query classifier, queries are identified as belonging to the topic. In other words, the topic-specific query classifier component identifies a plurality of fact-seeking queries that belong to the topic, wherein these fact-seeking queries are identified from a larger collection of queries from a search engine log.

At 608, a threshold number of domains that are relevant to the topic are identified. The domains can be identified by the domain identifier component 114, as described above. At 610, a multi-level (hierarchical) passage extraction system is trained to identify passages in pages that comprise answers to the queries, wherein the pages belong to the domains. As described above, the passage extraction system can be trained based upon feedback received from crowd-sourced workers operating client computing devices.

At 612, the queries identified at 606 are provided to the passage extraction system, which identifies passages that comprise answers for at least some of the queries. At 614, query-answer pairs are stored in a data repository based upon output of the passage extraction system, and the methodology 600 completes at 616.

Referring now to FIG. 7, an exemplary methodology 700 that facilitates identifying a passage that comprises an answer to a fact-seeking query that belongs to a topic is illustrated. The methodology 700 starts at 702, and at 704, a query is received at a first level ranker of a passage extraction system, wherein the first level ranker is provided with access to pages that belong to domains identified as being relevant to the topic. At 706, passages from these pages are ranked to generate a first ranked list of passages. At 708, a first threshold number of passages from the first ranked list of passages is selected, and a second level ranker is provided with this first threshold number of passages.

At 710, the second level ranker receives the query, and at 712 the first threshold number of passages is reranked by the second level ranker to generate a second ranked list of passages. At 714, a second threshold number of the most highly ranked passages from the second ranked list of passages is selected.

At 716, the query is received at a third level ranker of the passage extraction system, and at 718, the third level ranker re-ranks the second threshold number of passages to generate a third ranked list of passages. At 720, a most highly ranked passage in the third ranked list of passages is selected as comprising an answer to the query. While the methodology 700 is described with respect to three rankers in a hierarchical system, it is to be understood that the passage extraction system may include more than three rankers. The methodology 700 completes at 722.

Now referring to FIG. 8, an exemplary methodology 800 that is configured to transmit a passage to a client computing device, where the passage comprises an answer to a query received from the client computing device, is illustrated. The methodology 800 starts at 802, and at 804 a query is received from a client computing device. At 806, determination is made that the query is a fact-seeking query and belongs to a predefined topic. For example, a table of known fact-seeking queries can be searched based upon the received query, and it can be ascertained that the received query is included in the table of fact-seeking queries. At 808, a passage is identified that answers the query, wherein the passage has been extracted from a page belonging to a domain from amongst several domains that are labeled as being relevant to the topic. At 810, the passage is transmitted to the client computing device as an answer to the query, and the methodology completes at 812.

Figure 9:
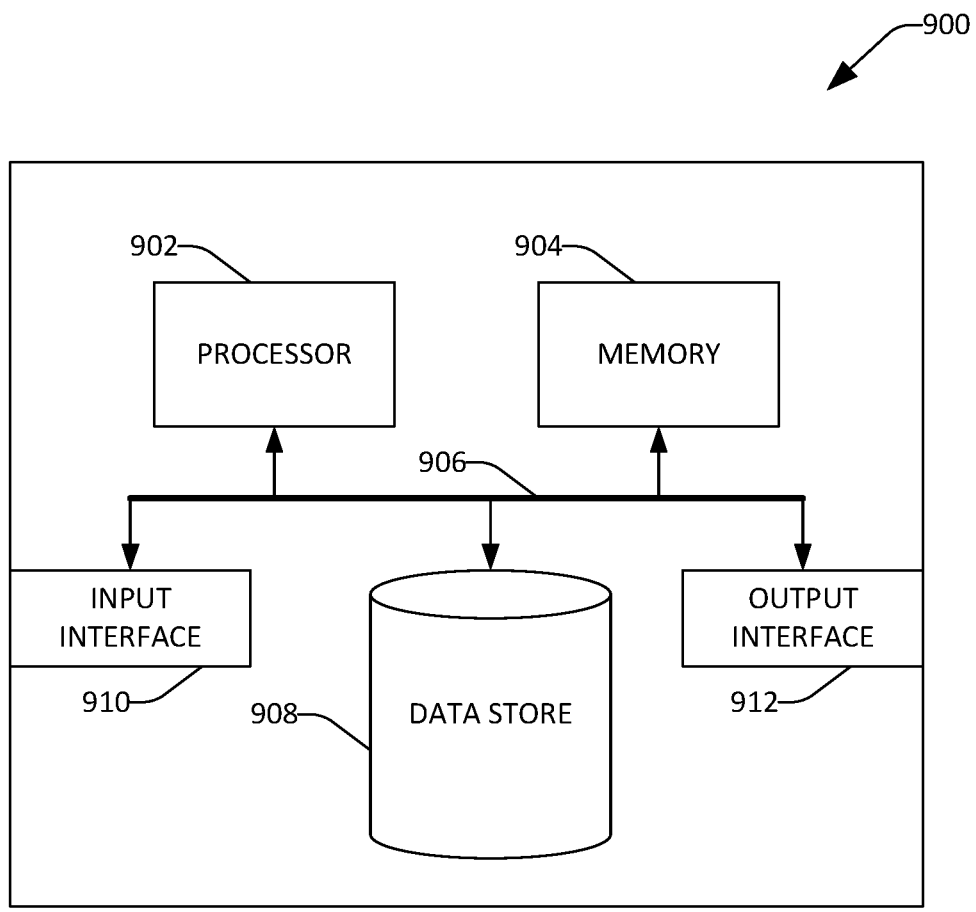
FIG. 9 is an exemplary computing system.

Referring now to FIG. 9, a high-level illustration of an exemplary computing device 900 that can be used in accordance with the systems and methodologies disclosed herein is illustrated. For instance, the computing device 900 may be used in a system that identifies an answer to a fact-seeking query that belongs to a topic. By way of another example, the computing device 900 can be used in a system that is configured to return an answer to a fact-seeking query in response to receiving the fact-seeking query. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store pages, a list of domains, passages, etc.

The computing device 900 additionally includes a data store 908 that is accessible by the processor 902 by way of the system bus 906. The data store 908 may include executable instructions, pages, search logs, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

It is contemplated that the external devices that communicate with the computing device 900 via the input interface 910 and the output interface 912 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 900 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system that is configured to return an answer to a fact-seeking query responsive to receipt of the fact-seeking query, the computing system comprising:
   a processor; and
   memory storing instructions that, when executed by the processor, cause the processor to perform acts comprising:
   labeling the fact-seeking query as belonging to a topic;
   based upon the fact-seeking query, labeling domains as being relevant to the topic, wherein each domain in the domains comprises a respective page, and further wherein each page comprises a respective passage;
   searching pages of the domains based upon the fact-seeking query, wherein several passages are identified when searching the pages;
   using a first ranker, ranking the passages with respect to the fact-seeking query to generate a first ranked list of passages;
   selecting a first threshold number of most highly ranked passages from the ranked list of passages;
   using a second ranker, re-ranking the first threshold number of passages with respect to the fact-seeking query to generate a second ranked list of passages;
   selecting a second threshold number of most highly ranked passages from the second ranked list of passages;
   selecting a passage from the second subset of passages as being an answer to the fact-seeking query; and
   when the fact-seeking query is received from a client computing device that is in network communication with the computing system, returning the passage as the answer to the fact-seeking query.

2. The computing system of claim 1, wherein a topic-specific classifier labels the fact-seeking query as belonging to the topic.

3. The computing system of claim 2, further comprising training the topic-specific classifier to identify queries that belong to the topic from a search engine log, wherein training the topic-specific classifier comprises:
   assigning a plurality of labels to a respective plurality of queries, wherein each label is indicative of whether or not a query belongs to the topic;
   transmitting the queries to a plurality of client computing devices operated by several users, wherein the client computing devices receive feedback from the users as to whether the queries belong to the topic;
   receiving the feedback from the client computing devices; and
   updating the topic-specific classifier based upon the feedback.

4. The computing system of claim 1, wherein labeling the domains as being relevant to the topic comprises:
   identifying, in a search log, a page represented by a search result in a search engine results page provided by a search engine based upon the fact-seeking query;
   identifying a domain to which the page belongs; and responsive to identifying the domain, labeling the domain as being relevant to the topic.

5. The computing system of claim 4, wherein the domain is labeled as being relevant to the topic based upon the page being identified by the search engine as being a most relevant page to the fact-seeking query.

6. The computing system of claim 4, wherein labeling the domains as being relevant to the topic further comprises:
identifying, in a search log of a search engine, a page that was selected by a user when the search engine included the page in search results responsive to receipt of the query; and
labeling the domain as being relevant to the topic based upon the page being selected by the user.

7. The computing system of claim 1, the acts further comprising:
subsequent to selecting the second subset of passages from the second ranked list of passages and prior to selecting the passage from the second subset of passages as being the answer to the fact-seeking query, using a third ranker, ranking the second subset of passages with respect to the fact-seeking query to generate a third ranked list of passages;
selecting a third subset of passages from the third ranked list of passages, the third subset of passages being a third threshold number of most highly ranked passages from the third ranked list of passages, wherein the passage is a most highly ranked passage in the third ranked list of passages; and
selecting the passage as being the answer to the fact-seeking query based upon the passage being the most highly ranked passage in the third ranked list of passages.

8. The computing system of claim 7, wherein the first ranker and second ranker are general purpose rankers, and further wherein the third ranker is specific to the topic.

9. The computing system of claim of claim 1, the acts further comprising:
repeating the acts for a second fact-seeking query and a second topic.

10. The computing system of claim 1, wherein the client computing device comprises a speaker, and further wherein returning the passage to the client computing device comprises causing the speaker of the client computing device to audibly output the passage.

11. The computing system of claim 1, wherein the passage is a table of values, and wherein returning the passage to the client computing device comprises causing the table to be presented on a search engine results page together with a plurality of search results for the fact-seeking query.

12. The computing system of claim 1, the acts further comprising:
receiving a domain explicitly identified by a developer as being relevant to the topic; and
including the domain in the domains based upon the domain being explicitly identified by the developer as being relevant to the topic.

13. A method for identifying an answer to a fact-seeking query, the method comprising:
using a classifier, assigning a label to the fact-seeking query as belonging to a topic, wherein the classifier is trained to identify queries that belong to the topic;
identifying domains that are relevant to the topic, wherein the domains comprise pages that belong to the domains;
searching the pages based upon the query, wherein searching the pages results in a plurality of passages from a subset of the pages being identified;
using a first ranker, ranking the plurality of passages to form a first ranked list of passages;
selecting a first threshold number of passages from the most highly ranked passages in the first ranked list of passages;
using a second ranker that is different from the first ranker, re-ranking the first threshold number of passages to generate a second ranked list of passages;
selecting a passage from the second ranked list of passages as the answer to the fact-seeking query; and
when the fact-seeking query is received from a client computing device, returning the passage as the answer to the fact-seeking query.

14. The method of claim 13, the acts further comprising:
receiving the fact-seeking query from the client computing device, the client computing receives the fact-seeking query as a voice query, wherein returning the passage as the answer to the fact-seeking query comprises causing a speaker of the client computing device to emit the passage audibly.

15. The method of claim 13, further comprising:
receiving a plurality of queries from a search log of a search engine, wherein the fact-seeking query is included in the queries, the classifier assigns a label to each queriy in the queries, and further wherein the classifier labels a plurality of queries from the queries as being fact-seeking queries that belong to the topic.

16. The method of claim 15, wherein a plurality of domains in the domains are identified as being relevant to the topic based upon content of the search log, wherein the plurality of domains comprise pages selected by users from search engine results pages provided by the search engine when the users issued the plurality of queries to the search engine.

17. The method of claim 13, further comprising:
selecting a second threshold number of passages from the most highly ranked passages in the second ranked list of passages;
using a third ranker that is different from the first ranker and the second ranker, ranking the second threshold number of passages to generate a third ranked list of passages; and
selecting the passage as the answer to the fact-based query based upon the passage being the most highly ranked passage in the third ranked list of passages.

18. The method of claim 17, wherein the first ranker and second ranker are general purpose rankers, and further wherein the third ranker is specific to the topic.

19. The method of claim 13, wherein at least one domain in the domains is identified as being relevant to the topic by a developer.

20. A computer-readable storage medium comprising instructions that, when executed by a processor, cause the processor to perform acts comprising:
using a classifier, assigning a label to a fact-seeking query as belonging to a topic, wherein the classifier is trained to identify queries that belong to the topic;
identifying domains that are relevant to the topic, wherein the domains comprise pages that belong to the domains;
searching the pages based upon the query, wherein searching the pages results in a plurality of passages from a subset of the pages being identified;

using a first ranker, ranking the plurality of passages to form a first ranked list of passages;
selecting a first threshold number of passages from the most highly ranked passages in the first ranked list of passages;
using a second ranker that is different from the first ranker, re-ranking the first threshold number of passages to generate a second ranked list of passages;
selecting a passage from the second ranked list of passages as the answer to the fact-seeking query; and
when the fact-seeking query is received from a client computing device, returning the passage as the answer to the fact-seeking query.

\* \* \* \* \*